DUAL PHOTOCELL OPTICAL TELEMETER USING PHASE COMPARISON

Filed March 31, 1964 5 Sheets-Sheet 1

DUAL PHOTOCELL OPTICAL TELEMETER USING PHASE COMPARISON

Filed March 31, 1964

3,325,647

DUAL PHOTOCELL OPTICAL TELEMETER USING PHASE COMPARISON

Roland Albert Sugier, Paris, France, assignor to Sud-Aviation Société Nationale de Constructions Aeronautiques, Paris, France Filed Mar. 31, 1964, Ser. No. 356,114
Claims priority, application France, Oct. 18, 1963, 951,043, Patent 1,396,327
13 Claims. (Cl. 250—204)

Optical telemetry involves measuring the distance $h$ of an object from a source of light illuminating it, by receiving the rays reflected by the object at a point located at a distance $d$ from the source along a straight line perpendicular to the line joining the source to the object. The reflected rays form an angle $\alpha$ with this straight line such that $$\tan \alpha = \frac{h}{d}$$

If, therefore, the angle $\alpha$ and the distance $d$, which is constant for the telemeter, are known, the distance $h$ of the obstacle from the source can be calculated. Optical telemetry can thus be reduced to measuring this angle $\alpha$.

The simplest and most natural way of measuring the angle $\alpha$ consists in determining the position of the centre of the image obtained at the measuring point by using a photoelectric cell which is moved along the focal plane of the receptive optical system in order to ascertain the position in which the cell receives the maximum amount of light.

This arrangement, however, has two drawbacks detrimental to accuracy of the system. The first stems from the fact that such a maximum value corresponds to a position of immobility and is therefore difficult to locate physically with any real accuracy. The second drawback arises from the fact that the object may be illuminated by light sources other than that of the telemeter, in which case the focal plane of the receptive optical system will include a background illumination tending to render the search for the position of maximum illumination even more of a random process.

A first improvement was obtained by illuminating the object with a periodically occulted light source, whereby the illumination of the image to be received and observed is comprised of the ambient illumination and a periodic illumination from the telemeter. In this specific instance, the photoelectric cell furnishes a complex current composed of a direct current representing the ambient illumination and a superimposed alternating or pulsating component representing the illumination from the telemeter alone. The position of the centre of the image to be observed is then the position in which the A-C component through the cell is at maximum amplitude.

A second improvement was achieved by replacing the single photoelectric cell by two adjacent cells and seeking the position in which the two cells were illuminated to an equal degree. This solution raises specific problems which were solved in the United States patent application Ser. No. 191,942, filed on May 2, 1962, now Patent No. 3,224,319, by André Charles Robert and Gilles Eugène Romain Trincard, and assigned to Sud-Aviation Société Nationale de Constructions Aéronautiques, patent application in which the optimum position is determined by seeking the position corresponding to equality of amplitude in the signals furnished by the two cells, this being done by extracting the two signals and comparing them after amplification.

In accordance with the present invention, the signals delivered by the two image observation cells are submitted to a subtraction, following which the resulting difference signal is amplified, then combined with a signal which is synchronous and in phase with the periodic illumination of the object, whereby to determine even more accurately the position in which the centre of the interval existing between the cells coincides with the center of the image, by servo-controlling the motor which displaces the carriage carrying the image observation cells in relation with the combined signal.

This invention accordingly has for its object to provide an optical telemetry method which includes the steps of ascertaining the difference between the voltages delivered by the two adjoining image observation cells in response to the illumination they receive, of subjecting the difference signal thereby obtained to a synchronous detection by a periodic reference signal which is synchronous and substantially in phase with the periodic illumination of the object, and of using the resultant signal for servo-controlling the position of the compound comprising the two measuring cells and jointly centering the same upon the centre of the image received.

Preferably, the method hereinbefore specified is supplemented by a process of defining the range of servo-control by means of the voltages furnished by the two image observation cells.

In a first form of application, this defining process is effected after the difference between the voltages furnished by the two cells has been determined, by causing the difference signal to further undergo a synchronous detection by a periodic reference signal substantially in phase quadrature with the periodic illumination of the object, the signal detected in this way being used to define the range of servo-control.

In a second form of application, the defining of the range of servo-control is effected after said difference signal has undergone separate synchronous detections by two periodic reference signals, of which one is substantially in phase and the other substantially in phase quadrature with the periodic illumination of the object, by extracting the absolute magnitudes of the two signals thus detected and adding these two absolute magnitudes together whereby to obtain a fresh signal for defining the range of servo-control.

The invention further has for its object to provide an optical telemeter with means for periodically occulting the light source, of the type having two image observation photoelectric cells mounted side by side on a carriage which is movable in front of the telemeter observation window in response to an electric motor, additionally comprising generator means of a signal corresponding to the difference in illumination of the two cells, a source for providing a reference signal synchronous and in phase with the periodic illumination of the object, a synchronous detector for receiving the signals from said generator and said source and the output of which controls the electric motor whereby to displace said carriage over the range of servo-control until the centre of the interval separating the adjoining cells is caused to coincide with the centre of the image received, a local source of current for powering said motor and seeking said range, and means for linking said motor either to said detector or to said source of current.

The apparatus described hereinabove may comprise in addition means for furnishing a signal defining the range of servo-control.

The description which follows with reference to the accompanying non-limitative exemplary drawings will give a clear understanding of how the invention can be carried into practice.

Figure 12:
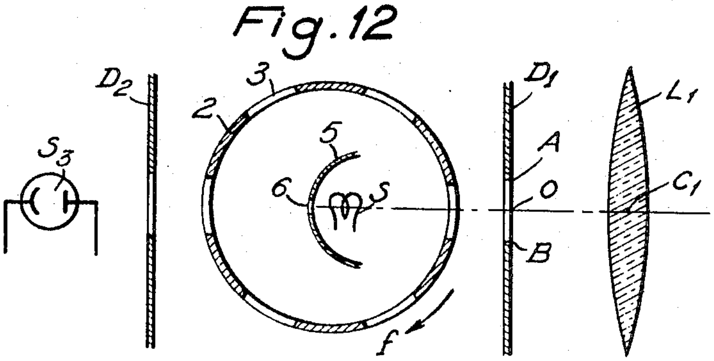
Figure 13:
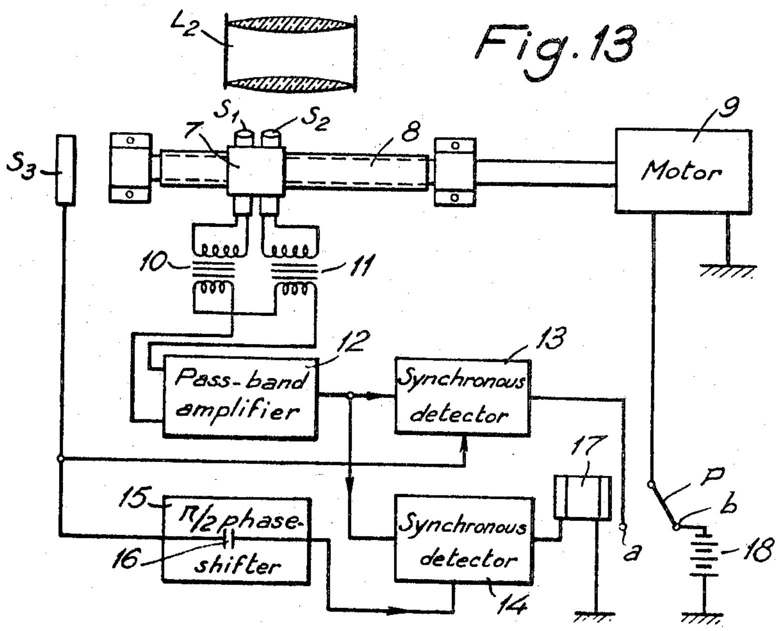
Figure 18:
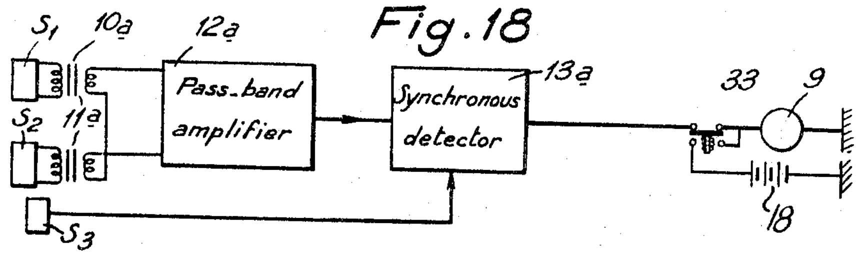
Figure 19:
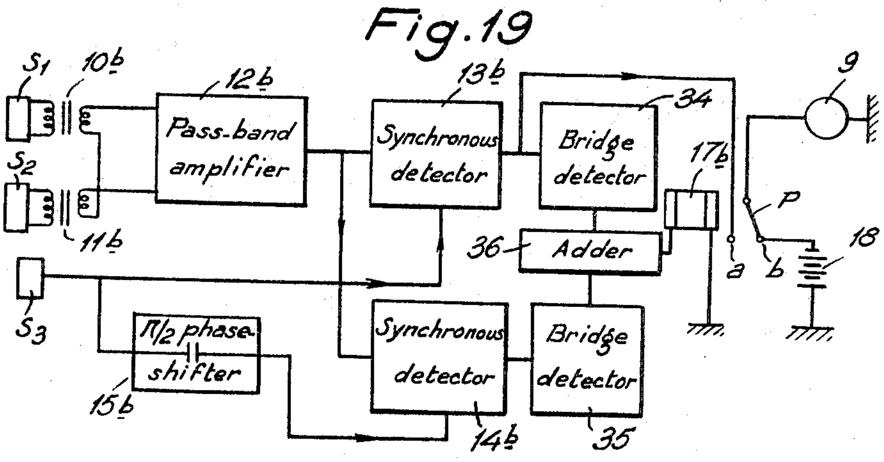
Figure 14:
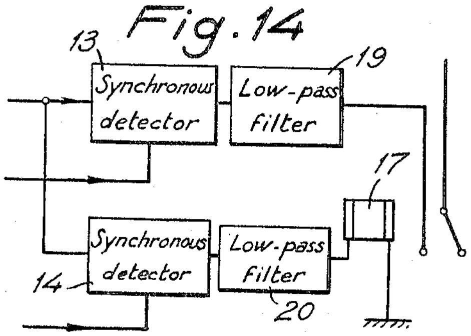
Figure 16:
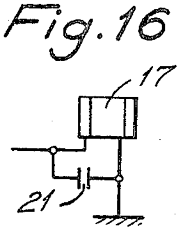
Figure 17:
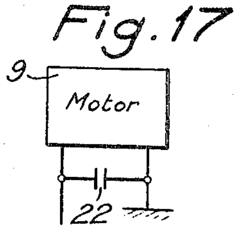
Figure 21:
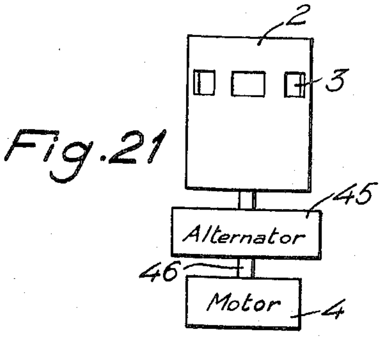
Figure 15:
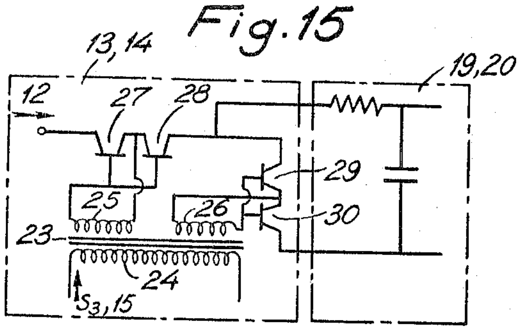
Figure 20:
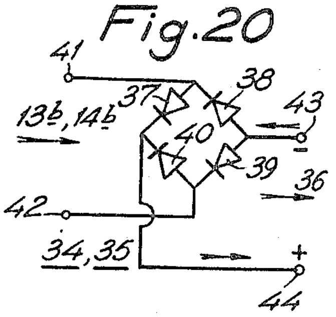
Figure 22:
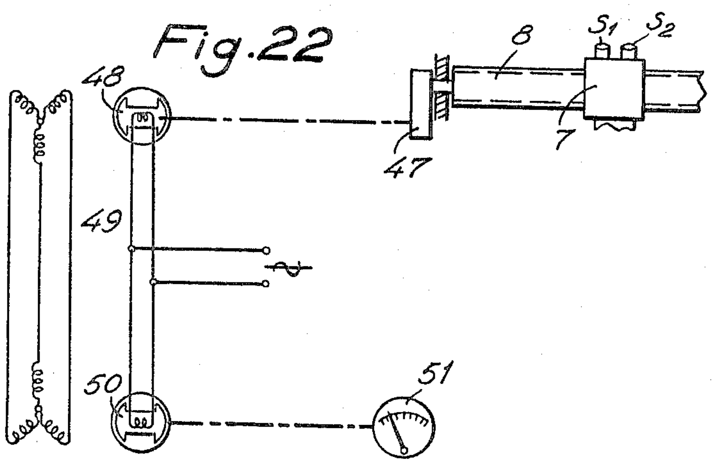

FIG. 12 schematically illustrates a possible method of mounting the reference photoelectric cell;

FIG. 13 is a diagrammatic representation of a first embodiment of an optical telemeter according to the present invention;

FIG. 14 is a first alternative embodiment of the arrangement of FIG. 13;

FIG. 15 shows the circuit diagram of a synchronous detector and the associated low-pass filter;

FIGS. 16 and 17 are two further alternative embodiments of the arrangement of FIG. 13;

FIG. 18 schematically illustrates a second form of embodiment of an optical telemeter according to the invention;

FIG. 19 schematically illustrates a third form of embodiment of an optical telemeter according to the invention;

FIG. 20 diagrammatically illustrates a bridge-type detector for use in the arrangement shown in FIG. 19;

FIG. 21 schematically illustrates a further possible embodiment of the source of reference signals; and FIG. 22 schematically illustrates indicator means of the distance of the object.

Figure 1:
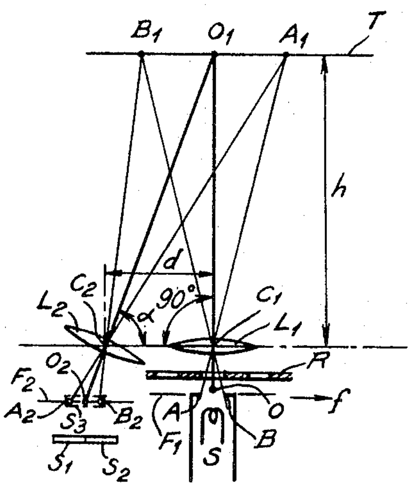
FIG. 1 is a diagram explaining the principles of optical telemetry.

Referring first to FIG. 1, if a source of light S illuminates a window AOB placed adjacent the focal plane $F_1$ of a lens or system of lenses $L_1$, then said lens or system of lenses $L_1$ will produce on a given object T a real image $A_1O_1B_1$ of the window AOB. A second lens or system of lenses $L_2$ placed in proximity to $L_1$ will produce an image $A_2O_2B_2$ of $A_1O_1B_1$ in the focal plane $F_2$ of $L_2$. If the straight line joining the optical centres $C_1$ and $C_2$ of $L_1$ and $L_2$ (distant from each other by $d$) be perpendicular to the direction of emission of the light, and if $OO_1$ be the main optical axis of the lens or system $L_1$, then the triangle $C_2C_1O_1$ will be right-angled, giving the relation $$\frac{O_1C_1}{C_2C_1}=\tan \widehat{O_1C_2C_1}$$

or $$\tan \alpha=\frac{h}{d}$$

where $\alpha$ is the angle $\widehat{O_1C_2C_1}$ and $h$ the distance $O_1C_1$ to be measured along the lighting line, $d$ being the base $C_2C_1$ of the telemeter.

Optical telemetry in this instance involves measuring the angle $\alpha$.

A modulator is therefore used, as is known, to modulate the light emitted by the source S, which modulator may consist of a cogged wheel 1 (see FIG. 2), or a cylinder 2 having slots 3 therein (see FIG. 3), in which the widths $l$ of the masking zones and the widths $o$ of the unmasking zones are respectively equal to one another. This modulator is rotated at constant or substantially constant speed by a motor 4 and so positioned as to periodically mask and unmask the window AOB, as represented at R in FIG. 1.

If the modulator be moving in the direction of the arrow $f$, it will be seen that the point A of the window AOB will be unmasked before the point B. Upon the image $A_2O_2B_2$, the point $A_2$ will receive a periodically varying illumination, which has a phase leading with respect to the likewise periodically varying illumination of the point $B_2$. If, now, two substantially identical and simultaneously movable adjoining photoelectric cells $S_1$ and $S_2$ be positioned behind the image $A_2O_2B_2$, and assuming that it be possible to position a third virtual cell $S_3$, of the same width as the image $A_2O_2B_2$, exactly in coincidence therewith, then the respective possible positions I to VII of the set of movable cells $S_1$–$S_2$ with respect to the then stationary cell $S_3$ will be as represented in FIG. 4.

Figures 2, 3, 4:
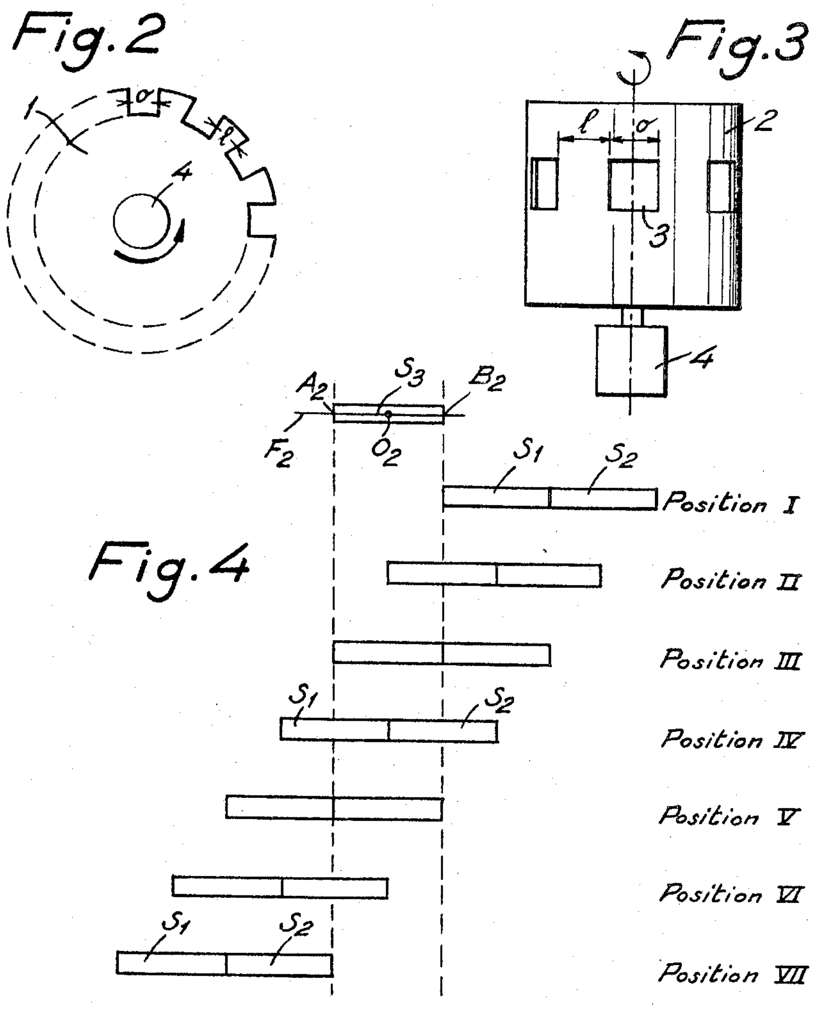
FIGS. 2 and 3 illustrate two possible embodiments of a device for modulating the illumination provided by the telemeter light source.
FIG. 4 shows the various positions which may be occupied in succession by the image observation photoelectric cells, with respect to a reference photoelectric cell coincident with the image.
Figure 5:
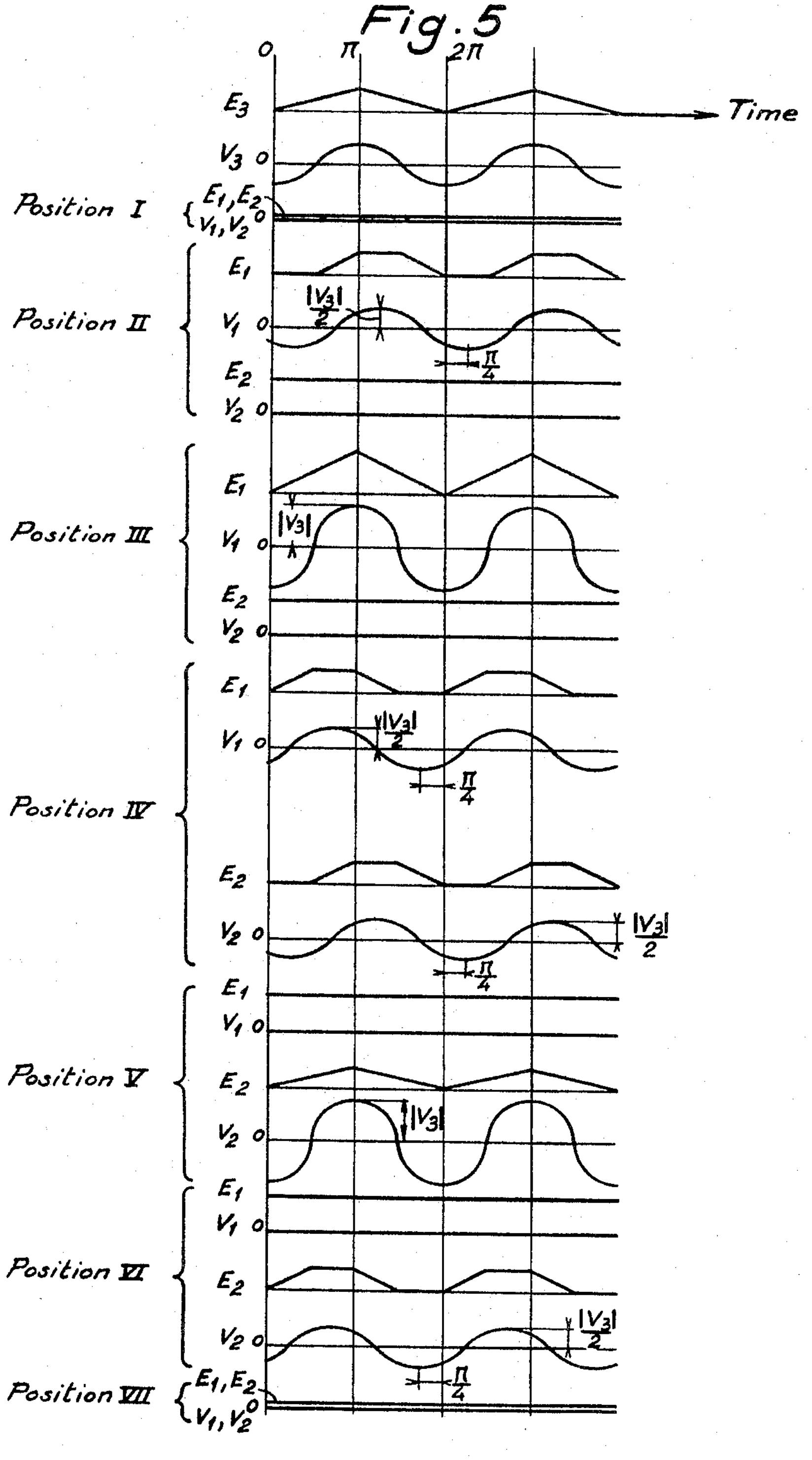
FIG. 5 shows graphically, as a function of time, the illumination magnitudes received by the three photoelectric cells in the successive positions of FIG. 4, together with the fundamental component of the current delivered by these cells for each of these positions.

Reference is now had to FIG. 5, which gives as a function of time the illumination curve $E_3$ of the cell $S_3$, together with the fundamental component $V_3$ of the electrical signal or current $i_r$ delivered by the cell $S_3$, and also, for each position I to VII of $S_1$ and $S_2$ relative to $S_3$ shown in FIG. 4, the corresponding illumination curves $E_1$ and $E_2$ of cells $S_1$ and $S_2$ respectively, as well as the fundamental components $V_1$ and $V_2$ of the electrical signals or currents $i_1$ and $i_2$, respectively, delivered by these cells. All these curves are periodic functions of identical frequency, and the representation is given as a function of the phase angle.

It will then be seen that with the cell $S_3$ stationary relative to the image $A_2O_2B_2$, the current curve $i_r$ and the function $V_3$ remain invariable in all these different positions. On the other hand, in regard to cells $S_1$ and $S_2$—

In position I:
- $i_1$ and $i_2$, and $V_1$ and $V_2$, are null;

In position II:
- $V_1$ lags by $\pi/4$ relative to $V_3$ and its amplitude is equal to $\frac{1}{2}|V_3|$;
- $V_2$ is null;

In position III:
- $V_1$ is in phase with $V_3$ and its amplitude is equal to $|V_3|$;
- $V_2$ is again null;

In position IV:
- $V_1$ has a phase lead of $\pi/4$ relative to $V_3$;
- $V_2$ has a phase-lag of $\pi/4$ relative to $V_3$;
- the amplitude of $V_1$ and $V_2$ are each equal to $\frac{1}{2}|V_3|$;

In position V:
- $V_1$ is null;
- $V_2$ is in phase with and has the same amplitude as $V_3$;

In position VI:
- $V_1$ is null;
- $V_2$ has a phase lead of $\pi/4$ relative to $V_3$ and an amplitude equal to $\frac{1}{2}|V_3|$; and In position VII:
- $V_1$ and $V_2$ are both null once more.

Considering now FIG. 4 with reference to the curves of FIG. 5, it will be seen that, in position IV, whereas the illuminations of observation cells $S_1$ and $S_2$ vary periodically through time in the same way, the illumination of cell $S_1$ has a phase lead of $\pi/2$ with respect to that of cell $S_2$. This property is used to control the movement of the adjoining cells $S_1$, $S_2$ until the centre of their interval is brought into coincidence with the centre $O_2$ of the received image $A_2O_2B_2$. In accordance with the invention, the signals furnished by cells $S_1$ and $S_2$ are combined together and the resultant signal combined with the signal furnished by cell $S_3$.

Figure 6:
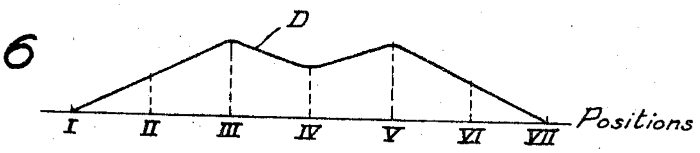
FIG. 6 shows the form of the signal representing the difference in illumination of the observation cells as the same are moved through the successive positions of FIG. 4.

The combination $K(V_1-V_2)$ obtained by plain subtraction gives a signal representing the difference between the illuminations of cells $S_1$ and $S_2$ as the latter shift from position I to position VII. The amplitude of this difference signal is null in position I (see FIG. 5), reaches a maximum value A in position III (by way of a value $A/2$ in position II), drops to 0.7A in position IV, reverts to A in position V, then to $A/2$ in position VI, and is then zero once more in position VII. Its variation pattern is shown by the curve D in FIG. 6.

Figure 7:
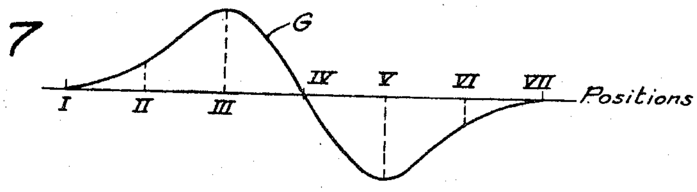
FIG. 7 represents the signal detected subsequent to synchronous detection of the signal of FIG. 6 by the reference signal in phase.

If a coherent demodulation is effected, i.e. a synchronous detection of the signal $K(V_1-V_2)$, taking as datum the signal $V_3$ furnished by cell $S_3$ after elimination, by any high-constant circuit, of the periodic terms entering into the signal obtained (which is a product of the signals $K(V_1-V_2)$ and $V_3$), a D-C signal will be obtained of the form represented by the curve G in FIG. 7. It will be seen that this signal is eminently suitable as an error voltage for energizing a servo-control motor the function of which would be to bring the system as a whole into the desired position IV and to maintain it therein, since this signal has zero value in position IV and a sign indicative of the sense of the error wth respect to the ideal position IV.

Figure 8:
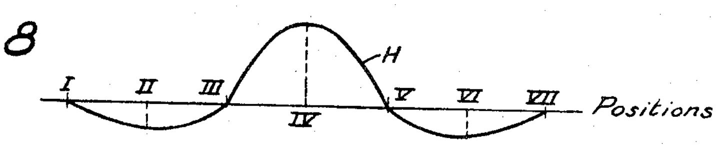
FIG. 8 represents the signal detected subsequent to synchronous detection of the signal of FIG. 6 by the reference signal in phase quadrature.

If a synchronous detection be effected of this signal $K(V_1-V_2)$, taking as reference not the signal $V_3$ furnished by cell $S_3$ but the signal in phase quadrature therewith, designated $$\left(V_3+\frac{\pi}{2}\right)$$

after elimination of the periodic terms, as indicated precedingly, there will be obtained a further D-C signal the amplitude and sign of which will vary as shown by the curve H of FIG. 8. It may be observed that this signal is positive over the entire range of positions III, IV, V and is not zero in position IV. Such a signal is entirely appropriate for defining a range within which the system is capable of fulfilling its servo-control function, for if the synchronous detection be utilized simultaneously with the $V_3$ signal, the servo-control signal shown in FIG. 7, the sign of which is indicative of the error sense with respect to the ideal position IV, will be found to have, over the zone III, IV, V, an amplitude substantially proportional to the error.

For a proper appreciation of the foregoing, it is thought to be necessary to point out that a synchronous detector is a system to which is applied a periodic signal $E(t)$ of period T and a reference signal of identical period which is phase-shifted relative to the former by a value $\beta$, such a system being capable of furnishing a signal $$D_\beta\cdot T=\int_\beta^{\frac{T}{2}+\beta}E(t)\,dt-\int_{\frac{T}{2}+\beta}^{T+\beta}E(t)\,dt$$

the mean value D of which is called the detected signal. In the specific case of a synchronous detection with phase quadrature, the mean value D is taken from the signal $$D_{\beta+\frac{T}{4}}\cdot T=\int_{\beta+\frac{T}{4}}^{\beta+\frac{3T}{4}}E(t)\,dt-\int_{\beta+\frac{3T}{4}}^{\beta+\frac{5T}{4}}E(t)\,dt$$

It is also possible to use other combinations of the signals furnished by the cells $S_1$ and $S_2$.

Figure 9:
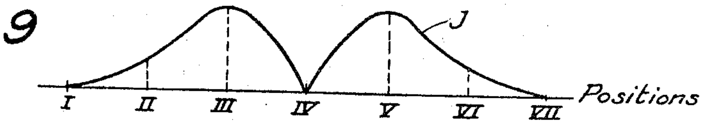
FIG. 9 represents the module of the signal of FIG. 7.
Figure 10:
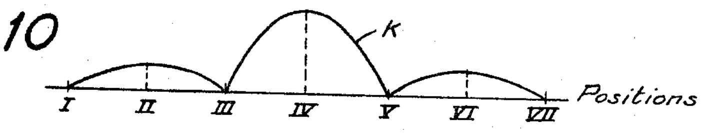
FIG. 10 represents the module of the signal of FIG. 8.
Figure 11:
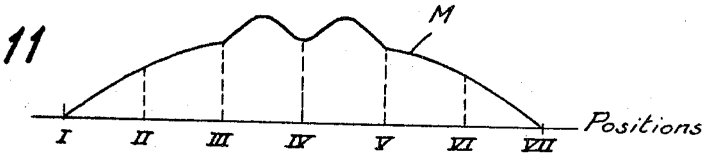
FIG. 11 represents a signal equal to the sum of the signals of FIGS. 9 and 10.

Thus, if it be desired to broaden the servo-control range from position I through to position VII, the following combination may be resorted to:

The module of the signal of FIG. 7, represented by the curve J of FIG. 9, is added to the module of the signal of FIG. 8, represented by the curve K of FIG. 10, thereby obtaining the signal represented by the curve M of FIG. 11. This solution has the advantage of widening the servo-control range, but it should be noted that between positions I and III and positions V and VII the servo-control voltage represented by the curve G of FIG. 7 is no longer proportional to the error; moreover, it entails a degree of added complexity which may not always be warranted from the economic standpoint.

FIG. 12 shows a preferred method of providing the illumination for the reference cell $S_3$ in phase with the illumination of the object. The illuminating lamp constituting the light source S is located at the focal point of an associated concave mirror 5 which reflects most of the light in the direction of the lens or optical system $L_1$ whose optical centre is designated by $C_1$. After having been periodically occulated by a drum 2 embodying slots 3 of the type shown in FIG. 3 and rotating in the direction of arrow $f$, the light beam passes through a diaphragm $D_1$ having therein an aperture AOB. The system described hereinabove is equivalent to the emitting system shown in FIG. 1.

The reference signal is obtained by disposing the cell $S_3$ behind a diaphragm $D_2$ identical to diaphragm $D_1$ and which is diametrically opposed to diaphragm $D_1$ with respect to the drum 2. The diaphragm $D_2$ receives a small portion of the light emitted by the source S through a small hole 6 provided in the mirror 5. This ensures that the photoelectric cell $S_3$ is illuminated synchronously and in phase with the object.

FIGS. 13 to 20 show various possible forms of embodiment of an optical telemeter according to the present invention, by recourse either to the combination of the signals of FIGS. 7 and 8 (FIG. 13), to the signal of FIG. 7 uniquely (FIG. 18), or to the combination of the signal of FIG. 7 with the signal of FIG. 11 (FIG. 19).

In the embodiment shown in FIG. 13, photoelectric cells $S_1$ and $S_2$ are mounted on a carriage 7 which is adapted to be traversed before the receptive optical system $L_2$ by means of a lead-screw 8 drivingly engaging said carriage and driven by a servo-control motor 9.

The signals furnished by cells $S_1$ and $S_2$ are respectively applied to transformers 10 and 11 the secondary windings of which are series-connected in phase opposition, whereby they furnish an output signal $K(V_1-V_2)$. This signal is applied to an automatic gain control amplifier 12 which steps up the level thereof. In order to lessen the influence of noise, this amplifier comprises filtering means having a pass-band of, say, $8\pm0.8$ kilocycles. This pass-band amplifier 12 may be constituted either by an ordinary aperiodic amplifier followed by a band-pass filter, or by an amplifier comprising a tuned circuit.

The output signal from amplifier 12 is led into two different synchronous detectors. The first detector 13 is excited directly by the signal $V_3$ furnished by the cell $S_3$ and delivers an output signal $K(V_1-V_2)$ which is detected by $V_3$ and represented by the curve G of FIG. 7. The second detector 14 is excited by the signal $V_3$ through a phase-shifter 15 providing a phase-shift of $\pi/2$, an example being a capacitor 16. The detector 14 delivers an output signal $K(V_1-V_2)$ which is detected by $$\left(V_3+\frac{\pi}{2}\right)$$

and represented by the curve H of FIG. 8. The output signal from 14 energizes a polarized relay 17 which operates only in response to the positive half-wave of this signal. This relay 17 is used to power the motor 9 which displaces the carriage 7 supporting the two cells $S_1$ and $S_2$.

When the cells $S_1$ and $S_2$ are outside the range of servo-control, i.e. outside the range covered by positions III to V, the relay 17 remains inoperative. The motor 9 is then powered at constant speed by an external source 18 connected to the fixed contact *b* of relay 17, which contact is in turn connectable to the motor 9 through the travelling vane P of relay 17. In this situation, the motor 9 will be rotating in a given direction at constant speed. If its direction of rotation is such as to cause the carriage 7 to recede from the range of servo-control bounded by positions III and V of cells $S_1$ and $S_2$, such rotation will continue until the carriage 7 butts, in the manner well known per se, against a limit switch which reverses the direction of rotation of the motor and returns the cells $S_1$ and $S_2$ towards said range of servo-control. As soon as the carriage penetrates this range, either through position III or through position V, the relay 17 operates and, by urging the travelling vane P into contact with the fixed contact *a* connected to the output of synchronous detector 13, causes the motor 9 of carriage 7 to be energized by the servo-control voltage $K(V_1-V_2)$ detected by $V_3$. The carriage 7 will then halt in the desired position IV. For greater simplicity, the servo-control motor 9 is chosen of the permanent-magnet type. The system can be further improved by providing low-pass filters 19 and 20 at the output ends of synchronous detectors 13 and 14 (see FIG. 14), which filters suppress the ripple in the D-C voltages for energizing the motor 9 or the relay 17.

Each of synchronous detectors 13 and 14 may be provided in the manner shown in FIG. 15. Such a detector comprises a transformer 23 having a single primary winding 24 to which is applied the reference signal furnished by the cell $S_3$ or the $\pi/2$ phase-shifter 15. The transformer 23 also comprises two secondary windings 25 and 26. Secondary winding 25 has one of its ends connected to the mutual point of two transistors 27 and 28 and its other end to the bases of these transistors. The emitter of transistor 27 receives the signal to be detected furnished by pass-band filtering amplifier 12. In similar fashion to the secondary winding 25, the other secondary winding 26 has its ends respectively connected to the mutual point and the bases of two transistors 29 and 30. The emitter of transistor 29 is connected to the emitter of transistor 28. The mutual point of transistors 28 and 29 and the collector of transistor 30 are connected to the low-pass filter 19 (or 20).

Instead of being effected by means of low-pass filters 19 and 20, the filtering process prior to utilization of the signals delivered by synchronous detectors 13 and 14 can be effected by means of a capacitor 21 which shunts the polarized relay (FIG. 16), or by a capacitor 22 which shunts the motor 9 (FIG. 17).

Provided it will suffice to servo-control the motor 9 without limiting the range of servo-control, the circuitry of FIG. 13 may be transformed into that of FIG. 18, in which counterpart components of FIG. 13 bear the same reference numerals followed by the letter *a*. In this instance, the polarized relay 17, the phase-shifter 15 and the synchronous detector 14 are dispensed with. The output from synchronous detector 13*a* may be applied to the motor 9 through a changeover switch 33, whereby the motor is powered either by the voltage delivered by the detector 13*a* or by the voltage from the auxiliary source 18 in order to provide stepwise displacement of the carriage bearing the cells $S_1$ and $S_2$ until stoppage of motor 9, which corresponds to zero value of the signal of FIG. 7 in the desired position IV.

Should it be desired to utilize both the signal of FIG. 7 for servo-control purposes and the signal of FIG. 11 for defining a broadened range of servo-control, the circuitry of FIG. 13 may be modified to comply with that of FIG. 19, wherein counterpart components of FIG. 13 bear the same reference numerals followed by the letter *b*. In this instance, the output signal from synchronous detector 13*b* is applied both to the fixed contact *a* of polarized relay 17*b* and to a bridge detector 34 the output signal of which represents the module of the signal delivered by synchronous detector 13*b*. The synchronous detector 14*b* is connected to a bridge detector 35 the output signal of which represents the module of the signal delivered by said synchronous detector 14*b*. The bridge detectors 34 and 35 are connected to an adder 36 the output signal of which—representing the sum of the modules of the signals delivered by synchronous detectors 13*b* and 14*b*—energizes the polarized relay 17*b*. This system operates in similar fashion to that shown in FIG. 13, except that the range of servo-control extends in this case from position I through to position VII of observation cells $S_1$ and $S_2$.

The bridge detector—occasionally referred to in the art as a "ring modulator"—consists, as shown in FIG. 20, of a bridge comprising diodes 37 to 40 in its four branches. The diagonal which separates the diodes of identical conducting sense receives, at 41 and 42, the signal delivered by the synchronous detector 13*b* or 14*b*. The diagonal of this bridge that separates the diodes of reverse conducting sense delivers, at 43 and 44, the signal applied to the adder 36.

It will be obvious to those skilled in the art that many modifications may be made to the specific forms of embodiment described hereinabove without departing from the spirit and scope of the invention. By way of example, the cell $S_3$ giving the reference signal may be disposed in any convenient location whereby to receive a deflected portion of the light issuing from the lens or optical system $L_1$ of FIG. 1. Similarly, instead of being provided in the form of a photoelectric cell, the source of reference signals may be constituted, as shown in FIG. 21, by an alternator 45 keyed to the shaft 46 of the motor 4 driving the cogged wheel 1 or slotted drum 2, which alternator would comprise a number of pairs of poles equal to the number of wheel cogs or drum slots.

If the optical systems $L_1$ and $L_2$ are identical, the image $A_2O_2B_2$ will have the same dimension as the window AOB by virtue of the principle of reciprocity, irrespective of the distance of the object T; as a result, the adjoining photoelectric cells $S_1$ and $S_2$ may each have a width equal to that of said image, as may also the reference cell $S_3$. On the other hand, if the optical systems $L_1$ and $L_2$ are different, the dimensional ratio of the image $A_2O_2B_2$ to the window AOB will remain constant, in which case the current curves will be slightly distorted, though this will not affect the position in which the servo-control system is arrested.

Readings of the distance *h* can be taken by known means. By way of example, the carriage/threaded-nut 7 supporting the cells $S_1$ and $S_2$ and the driving lead-screw 8 may be designed in the same way as micrometer screws or micrometer calipers. The distance can then be obtained from both the number of complete revolutions made by the nut and fractions of a revolution made by the lead-screw, using a calibration curve if necessary.

Furthermore, the lead-screw 8 of servo-control motor 9 may be made to drive a reduction gear which is in turn caused to move a pointer over a dial.

Similarly, as shown in FIG. 22, the lead-screw 8 may provide the drive input to a reduction gear 47 which is mechanically linked to the transmitting rotor 48 of a selsyn 49, the transducer rotor 50 of which is connected to a range indicator 51 graduated in distance.

The optical telemeter hereinbefore described may be used in the aeronautical field in particular, more specifically for determining the altitude of aircraft in flight.

What I claim is:

1. In an optical telemeter for measuring the distance of an object from a predetermined point, of the type having a periodically occulted light source located at said predetermined point for periodically illuminating said object and two image observation photo-electric cells adjacent at a fixed interval in the focal plane of a sighting optical system and mounted on a carriage driven in said plane by means of an electric motor along a straight line perpendicular to the lighting line which joins said source and said object; the improvement comprising generator means of a signal representing the difference in illumination of the two photo-electric cells to which said generator means is connected, a source of a reference periodic signal which is synchronous and in phase with the periodic illumination of the object, a synchronous detector connected to said generator means and to said signal source, a source of current, and means for separately connecting the electric carriage drive motor driving the carriage on which said two cells are mounted, on the one hand, to the output of said synchronous detector with a view to servo-control the displacement of said carriage by the output signal of said synchronous detector, whereby said carriage stops as soon as the centre of the interval separating said cells coincides with that of the image transmitted by the sighting optical system and, on the other hand, to said source of current for seeking the range of servo-control for the displacement of said carriage, and means for indicating the distance of said object from the predetermined point at the time of such a coincidence.

2. An optical telemeter according to claim 1, wherein the source of a reference periodic signal consists of a third photo-electric cell which is illuminated by a portion of the periodic light directed at the object.

3. An optical telemeter according to claim 1, wherein the source of a reference periodic signal consists of a third photo-electric cell which is illuminated by a light modulated in phase correlation with the periodic light directed at the object.

4. An optical telemeter according to claim 1, wherein the occulting device consists of a rotating device having individually equal occulting areas and individually equal open areas, and wherein the source of a reference periodic signal consists of an alternator keyed to the driving shaft of said rotating device and having a number of pairs of poles equal to the number of open areas on said device.

5. An optical telemeter according to claim 1, wherein the generator means of a signal representing the difference in illumination of the two photo-electric cells comprises two transformers having primary windings respectively connected to said two cells and secondary windings which are series-connected, and an automatic gain control pass-band amplifier connected to the synchronous detector and to which said secondary windings are connected in an opposed-phase relation.

6. An optical telemeter according to claim 5, wherein the means for connecting the electric motor to the synchronous detector and to the source of current consists of a manually operated changeover switch the movable element of which is connected to said motor.

7. An optical telemeter according to claim 5, wherein the means for connecting the electric motor to the synchronous detector and to the source of current comprises means connected to the source of a reference periodic signal and to the output of the automatic gain control pass-band amplifier for generating a signal defining the range of servo-control for the displacement of the carriage by the output signal of the synchronous detector, and a polarized relay connected to, and supplied by, said means and having a first fixed contact connected to the output of said synchronous detector, a second fixed contact connected to the source of current and a travelling vane connected to the carriage drive motor for supplying said motor by said source of current in order to bring the carriage in the servo-control range and by said synchronous detector as soon as said carriage enters said servo-control range.

8. An optical telemeter according to claim 7, wherein the means generating the signal defining the servo-control range comprises a $\pi/2$ phase-shifter connected to the source of a reference periodic signal, a second synchronous detector fed by said phase-shifter and connected to the output of the automatic gain control pass-band amplifier, and means for linking said second synchronous detector to the polarized relay.

9. An optical telemeter according to claim 8, wherein the second synchronous detector is directly connected to the polarized relay.

10. An optical telemeter according to claim 8, wherein the means for linking the second synchronous detector to the polarized relay comprises two bridge detectors respectively connected to the first and second synchronous detectors, and an adder fed by said two bridge detectors and connected to said polarized relay.

11. An optical telemeter according to claim 8, further comprising means for filtering the signals transmitted to the polarized relay.

12. An optical telemeter according to claim 11, wherein the filtering means comprises two low-pass filters respectively connected to the outputs of the synchronous detectors.

13. In an optical telemeter for measuring the distance of an object from a predetermined point, of the type having a periodic occulting device of a light source located at said predetermined point for periodically illuminating said object and two image observation photo-electric cells adjacent at a fixed iuterval in the focal plane of a sighting optical system and mounted on a carriage driven in said plane by means of an electric motor along a straight line perpendicular to the lighting line which joins said source and said object; the improvement comprising generator means of a comparison signal between the phases of the currents which are delivered by the two photo-electric cells, and means connecting the carriage drive motor to said generator means for servo-controlling the displacement of said carriage by said comparison signal with a view to stop said motor when the centre of the interval between the two cells coincides with that of the image given by the sighting optical system.

References Cited

UNITED STATES PATENTS

| | | | |
|---|---|---|---|
| 2,513,367 | 7/1950 | Scott | 250—203 |
| 2,612,814 | 10/1952 | Glasser | 88—14 |
| 2,921,757 | 1/1960 | Houle | 250—209 X |
| 3,037,423 | 6/1962 | Shurcliff | 250—204 X |

RALPH G. NILSON, *Primary Examiner.*

J. D. WALL, *Assistant Examiner.*